United States Patent
Hariharan et al.

(10) Patent No.: US 11,943,851 B2
(45) Date of Patent: Mar. 26, 2024

(54) NARROW PULSE WIDTHS IN H-BRIDGE BUCK-BOOST DRIVERS

(71) Applicant: Maxim Integrated Products, Inc., San Jose, CA (US)

(72) Inventors: Suresh Hariharan, Livermore, CA (US); Ron Vincent Ocampo, San Jose, CA (US); Ramesh Selvaraj, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/881,491

(22) Filed: Aug. 4, 2022

(65) Prior Publication Data
US 2023/0041463 A1 Feb. 9, 2023

Related U.S. Application Data

(60) Provisional application No. 63/229,641, filed on Aug. 5, 2021.

(51) Int. Cl.
*H05B 45/3725* (2020.01)
*H02M 1/32* (2007.01)
*H02M 3/158* (2006.01)
*H05B 45/10* (2020.01)
*H05B 45/325* (2020.01)

(52) U.S. Cl.
CPC .......... *H05B 45/3725* (2020.01); *H02M 1/32* (2013.01); *H02M 3/1582* (2013.01); *H05B 45/10* (2020.01); *H05B 45/325* (2020.01)

(58) Field of Classification Search
CPC .... H02M 1/4241; H02M 1/08; H02M 1/0048; H02M 1/0054; H02M 1/4258; H02M 1/0032; H02M 1/0058; H02M 1/36; H02M 3/01; H02M 3/33571; H02M 3/3385; H02M 1/0016; H02M 3/3382; H02M 3/3387; H02M 7/219; H02M 3/3376; H02M 3/338; H02M 1/32; H02M 3/1582; H05B 45/39; H05B 45/382; H05B 45/38; H05B 45/3725; H05B 45/18; H05B 45/56; H05B 45/10; H05B 45/325

See application file for complete search history.

(56) References Cited

U.S. PATENT DOCUMENTS 6,191,676 B1 * 2/2001 Gabor ................. H02M 1/4225
  336/160
7,218,173 B2 * 5/2007 Nalbant ..................... H03F 1/02
  330/251

(Continued)

FOREIGN PATENT DOCUMENTS

JP      2017139105 A    8/2017

*Primary Examiner* — Monica C King
(74) *Attorney, Agent, or Firm* — North Weber & Baugh LLP; Michael North

(57) ABSTRACT

Described herein are systems and methods for generating short load current pulses using an H-bridge. In various embodiments, this is accomplished by controlling, in a shunting mode, a low-side switch of the H-bridge to drive a first average current and controlling, in a non-shunting mode, a high-side switch of the H-bridge to drive a second average current such that the first and second average currents are substantially the same and reduce a current pulse width of the load current.

20 Claims, 9 Drawing Sheets

(56) References Cited

U.S. PATENT DOCUMENTS

| | | | |
|---|---|---|---|
| 8,130,128 B2* | 3/2012 | Alderson | H03F 3/217 |
| | | | 375/243 |
| 9,295,117 B2* | 3/2016 | Acatrinei | H05B 45/382 |
| 9,661,697 B2* | 5/2017 | Sadwick | H05B 45/18 |
| 10,263,510 B2* | 4/2019 | Jans | H02M 3/3385 |
| 10,418,913 B2* | 9/2019 | Jans | H02M 1/4241 |
| 10,447,147 B2* | 10/2019 | Op Het Veld | H05B 45/39 |
| 10,447,148 B2* | 10/2019 | Elferich | H02M 1/08 |
| 10,734,889 B2* | 8/2020 | Elferich | H02M 3/338 |
| 10,879,791 B2* | 12/2020 | Elferich | H05B 45/382 |
| 2013/0038234 A1 | 2/2013 | Van Der Veen et al. | |
| 2014/0265935 A1* | 9/2014 | Sadwick | H05B 45/56 |
| | | | 315/307 |
| 2017/0223795 A1* | 8/2017 | Sadwick | H05B 45/18 |
| 2018/0227995 A1 | 8/2018 | Ekbote et al. | |
| 2019/0006940 A1* | 1/2019 | Jans | H02M 1/08 |
| 2019/0044432 A1* | 2/2019 | Op Het Veld | H02M 7/219 |
| 2019/0044433 A1* | 2/2019 | Elferich | H02M 3/338 |
| 2019/0044434 A1* | 2/2019 | Elferich | H02M 3/01 |
| 2019/0081565 A1* | 3/2019 | Jans | H03K 5/2472 |
| 2020/0007032 A1* | 1/2020 | Elferich | H02M 1/4241 |
| 2023/0041463 A1* | 2/2023 | Hariharan | H05B 45/325 |

\* cited by examiner

NARROW PULSE WIDTHS IN H-BRIDGE BUCK-BOOST DRIVERS

CROSS REFERENCE TO RELATED PATENT APPLICATIONS

The present application claims priority benefit, under 35 U.S.C. § 119(e), to commonly-assigned U.S. Provisional Patent Application No. 63/229,641, filed on Aug. 5, 2021, entitled "Narrow Pulse Widths in H-Bridge Buck-Boost Drivers," and listing as inventors Suresh Hariharan, Ron Vincent Ocampo, and Ramesh Selvaraj, which application is herein incorporated by reference as to its entire content. Each reference mentioned in this patent document is incorporated by reference herein in its entirety.

BACKGROUND

A. Technical Field

The present disclosure relates generally to systems and methods for current or voltage regulators. More particularly, the present disclosure relates to systems and methods for achieving narrow pulse widths in H-bridge buck-boost driver applications such as Light-Emitting-Diode (LED) applications.

B. Background

Pulse-Width-Modulation (PWM) dimming is a common technique used with switched-mode drivers, such as LED drivers, e.g., to regulate a time-averaged current through an array of LEDs. FIG. 1 shows a simplified switched-mode LED driver circuit that utilizes high-side PWM dimming. A dimming period comprises a pulse duration in which the switched-mode LED driver performs switching operations. During these switching operations, the LED driver regulates a current that flows through a string of LEDs. Conversely, during an off period, in which the LED driver does not perform switching operations, the string of LEDs remains turned off. Many modern applications require very narrow pulse widths where, at the same time, it is desirable to maintain a relatively high LED current. Therefore, a challenge arises that involves being able to ramp a LED current to its regulation point within a relatively short period of time.

Accordingly, what is needed are systems and methods that allow to accommodate the short pulse widths as required by many applications, including modern LED driver applications.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
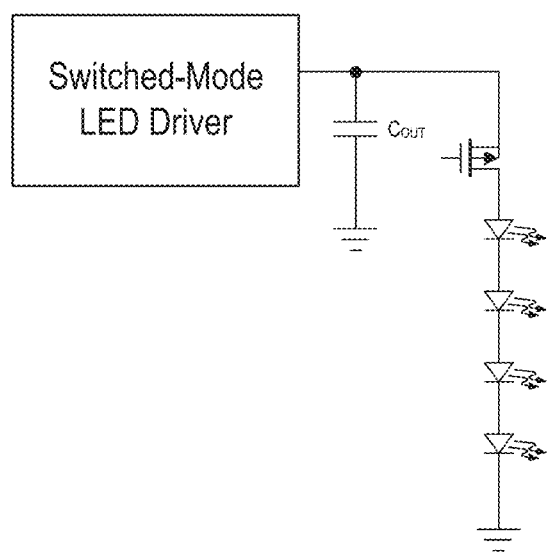
FIG. 1 shows prior art a switched-mode LED driver that utilizes high-side PWM dimming.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It shall be noted that embodiments described herein are discussed in the context of LED driver circuits, but one skilled in the art shall recognize that the teachings of the present disclosure are not limited to any specific driver circuit, voltage or current regulators, or LED applications and may equally be used in other contexts and to drive non-LED loads.

In this document the terms "regulator" and "converter," and the terms "LED string" and "LED array," are used interchangeably. "Control circuit" comprises microcontrollers, logic elements, amplifiers, comparators, and any other control elements recognized by one of skilled in the art.

As indicated in the Background, certain applications require very short pulse times, i.e., narrow pulse widths. One existing method for achieving such relatively short widths in LED systems utilizes shunt dimming. An exemplary switched-mode LED driver circuit that uses shunt dimming is shown in FIG. 2.

The shunt dimming circuit 200 comprises shunting FET 110, which is used as a shunting device that is placed in parallel with the string of LEDs 104. In operation, shunting FET 110 creates a controllable short circuit across the string of LEDs 104. Shunting FET 110 can turn the LEDs off during an off period in which LED driver 102 continues to drive a current through an inductor (not shown in FIG. 2) located within LED driver 102. Compared to PWM dimming methods using a circuit such as that shown in FIG. 1, the shunt dimming method used in connection with circuit 200 in FIG. 2 is able to achieve shorter pulse times and higher contrast ratios since a continuous inductor current can be maintained. This is mainly due to the fact that no time is wasted in having to build up a magnetic field in the inductor from scratch, rather one can take advantage of a continuous current flow through the inductor in the driver.

Figure 2:
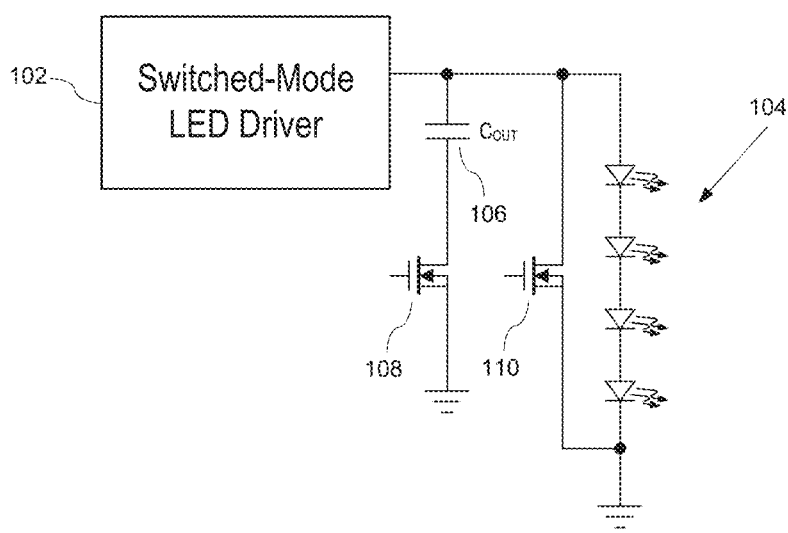
FIG. 2 shows an exemplary prior art switched-mode LED driver circuit that uses shunt dimming.

One major drawback of existing shunt dimming methods using a circuit such as that in FIG. 2, however, is that the output capacitor 106 is discharged when the string of LEDs 104 is shunted by FET 110. Buck LED driver topologies typically have a small output capacitor having a relatively small capacitance and, therefore, this does not present a serious problem in such applications. Other applications, however, require topologies that utilize a relatively larger output capacitor 106, such that the benefit of a continuous inductor current is negated by the fact that output capacitor 106 needs to be constantly recharged, e.g., from zero to a forward voltage of the LED string 104 in FIG. 2. Output capacitor 106, thus, needs to be isolated or disconnected from circuit 200 during shunting dimming such that output capacitor 106 does not discharge and cause an unwanted drop in the output voltage.

Figure 3:
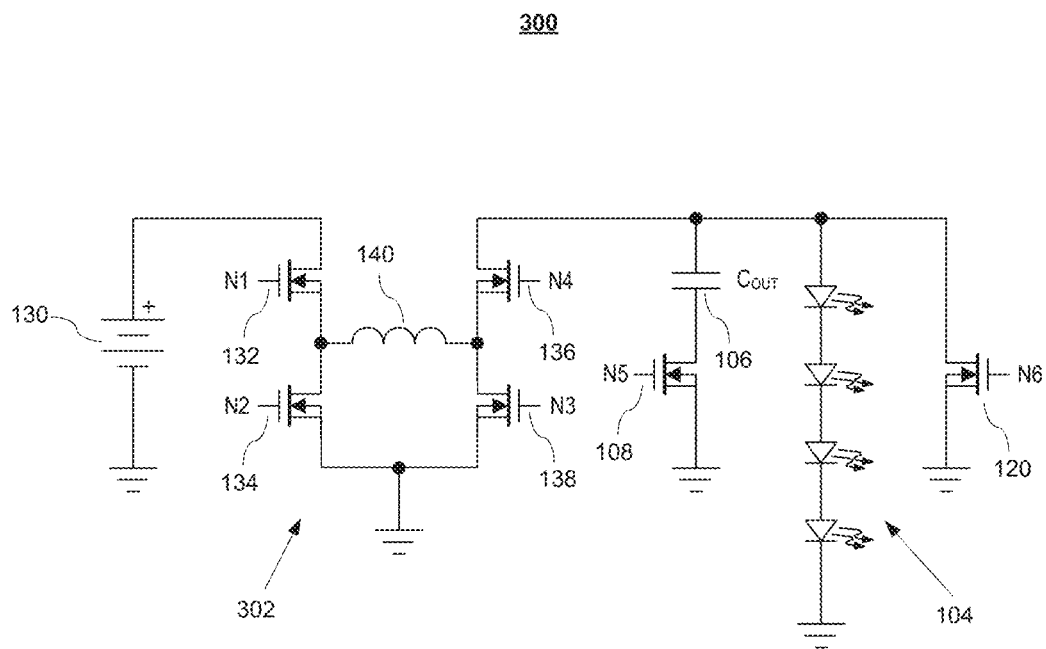
FIG. 3 depicts a common H-Bridge buck-boost LED driver with shunt dimming.

Accordingly, it is desirable to have low-cost systems and methods that allow to maintain a continuous inductor current to accommodate short pulse widths without negatively affecting overall circuit performance. Various embodiments herein allow for the use of shunt dimming, while achieving narrow PWM pulse durations without the need for dedicated shunting switch, or switched coupled in series with the output capacitor to prevent it from discharging in H-bridge buck-boost converters and related applications. FIG. 3 shows a common H-bridge buck-boost LED driver circuit As depicted in FIG. 3, H-bridge buck-boost LED driver circuit 300 comprises H-bridge 302 that is energized by power source 130 and comprises FETs 132-138 and inductor 140. Circuit 300 comprises output capacitor 106 that is coupled to a ground potential via FET 108. Circuit 300 further comprises bypass FET 120 that is coupled to optionally shunt LED string 104 to ground potential.

Figure 4:
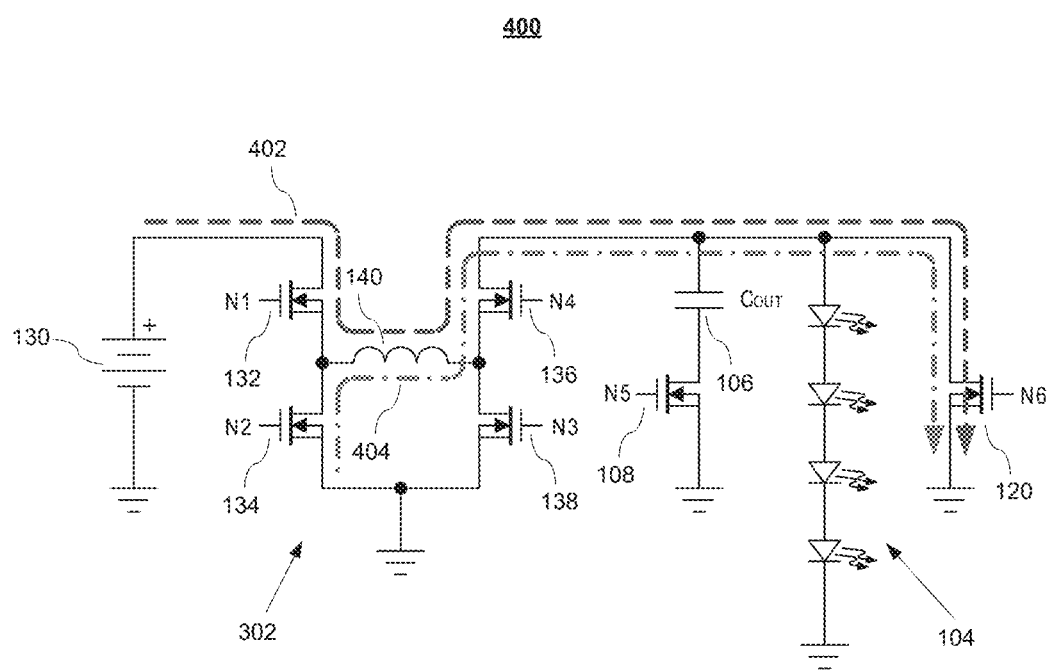
FIG. 4 depicts current paths when the circuit shown in FIG. 3 operates in shunt dimming.

In operation, when LEDs string 104 conducts current, FET 108 is closed, FET 120 is open, and a feedback loop (not shown) in H-bridge buck-boost LED driver circuit 300 controls the switching of FETs 132 through 138 to regulate a desired current through LED string 104, as indicated in FIG. 4, which depicts current paths during shunt dimming. Same numerals as in FIG. 3 denote similar elements. When the LEDs in string 104 are turned off, FET 108 is open, FET 120 is closed, and FETs 132 through 138 are controlled to maintain the current through inductor 140. Once FET 120 is closed, H-bridge 302 operates in a buck mode since the output voltage, which assumes a ground potential, will always be less than the input voltage.

Figure 5:
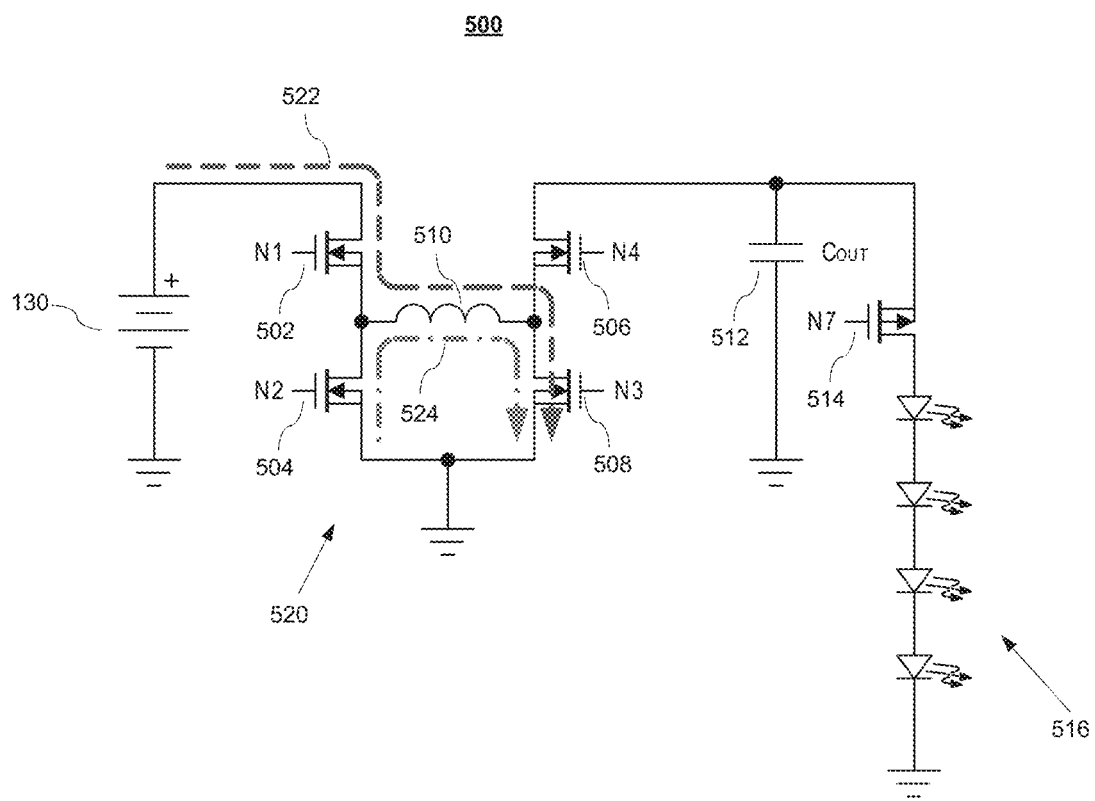
FIG. 5 illustrates a dimming method for an H-Bridge, according to various embodiments of the present disclosure.

FIG. 5 illustrates a dimming method for an H-Bridge, according to various embodiments of the present disclosure. H-bridge buck-boost LED driver circuit 500 comprises H-bridge 520, which is energized by power source 130 and comprises switches 502-508 and inductor 510. Circuit 500 further comprises LED string 516, switch 514, and output capacitor 512, which is coupled to a ground potential. It is noted that unlike circuit 400 in FIG. 4, output capacitor 512 is directly coupled to ground. In other words, output capacitor 512 does not require a switching element to shunt LED string 516 to a ground potential during operation.

Further, unlike the high-side PWM dimming configuration in FIG. 4, the circuit in FIG. 5, in addition to benefitting from the continuous inductor current of shunt dimming, takes advantage of a reduced number of circuit components, thereby reducing the complexities involved therewith and also reducing manufacturing cost. This is made possible by the fact that switch 506, in a shunting mode, is open and behaves like an isolation switch, while switch 508 remains closed, acting similar to bypass FET 120 in FIG. 4, and alternately switches 502 and 504. In this manner, a continuous current flowing through inductor 510 may be maintained in shunting mode.

Dashed lines in FIG. 5 indicate the current flow through inductor 510 when switches 502 and 504 alternate. For comparison, the phases of dashed lines 522 and 524 correspond respective phases of dashed lines 402 and 404 in FIG. 4. In effect, the topology illustrated in FIG. 5 combines the functions of FETs 120 and 138 into those of switch 508 and combines the functions of FETs 108 and 136 into those of switch 506.

In embodiments, it may be advantageous to have a current flowing through the inductor 510 in FIG. 5 that is not only continuous but is also regulated to the same value irrespective of whether LEDs in string 516 are in a conducting mode or turned off. To accomplish this, in embodiments, an average current mode control architecture, such as that shown in FIG. 6 may be implemented.

Figure 6:
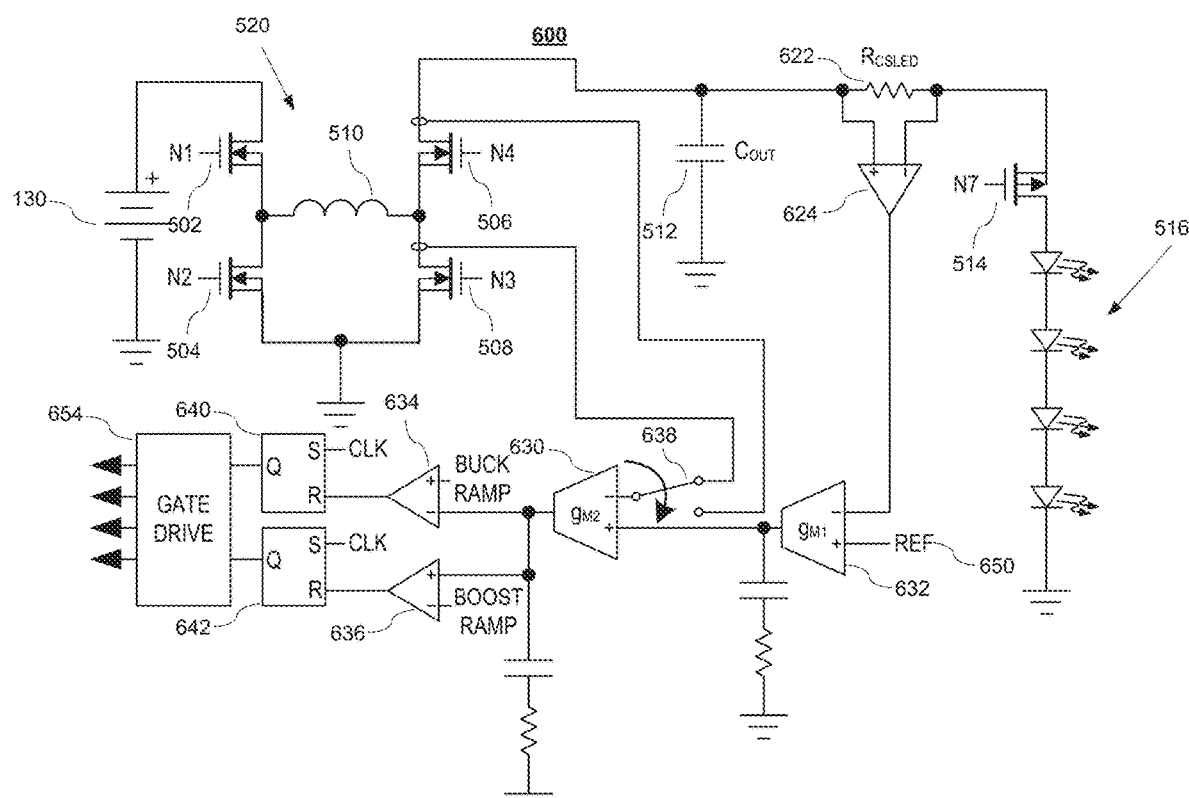
FIG. 6 illustrates an H-bridge buck-boost converter circuit utilizing average current mode control, according to various embodiments of the present disclosure.

FIG. 6 illustrates an exemplary H-bridge buck-boost converter circuit that utilizes average current mode control, according to various embodiments of the present disclosure. For clarity, components similar to those shown in FIG. 5 are labeled in a same manner. For purposes of brevity, a description or their function is not repeated here.

In embodiments, driver circuit 600 in FIG. 6 may comprise current sense amplifier 624, error amplifiers 630-632, comparators 634-636, clock-based logic circuitry 640-642, and gate driver 644. As depicted, driver circuit 600 comprises two feedback loops. A first loop (hereinafter, "inner loop") that may comprise switch 502, 504, 508, error amplifier 630, comparators 634-636, e.g., a pair of PWM comparators, logic circuitry 640-642, and gate driver 644; and a second loop (hereinafter, "outer loop") that may comprise switch 502-508, resistor 622, current sense amplifier 624, error amplifiers 630-632, comparators 634-636, logic circuitry 640-642, and gate driver 644.

In embodiments, current sense amplifier 624 and error amplifier 632 in the outer loop may be used to set a desired current through LED string 516, e.g., as determined by reference voltage 650 that may be user-programmable. As depicted, the output of error amplifier 632 may be used to control the input of error amplifier 630. In embodiments, once the LEDs in string 516 are conducting, the inner loop may generate an error voltage between the outer loop and the sensed current flowing through switch 506. The obtained error voltage may be input to the pair of PWM comparators 634-636, which may set the duty cycle of one or more of switches 502-508 of H-bridge 520 to regulate an average current through switch 506. In embodiments, since switch 506 is coupled in series with LED string 516, the feedback arrangement in FIG. 6 may adjust the average current flowing through switch 506 and the current flowing through LED string 516 to have substantially the same value. For example, the average current flowing through switch 506 may be substantially equal to the current flowing through LED string 516.

In embodiments, once the LEDs in string 516 are turned off, e.g., by switch 514, the outer loop error amplifier 632 may be disconnected to maintain the same value at the non-inverting input of the inner loop error amplifier 630. The inner loop amplifier 630 may then be switched, via switch 638, to sense the current flowing through switch 508. In this manner, the same average current that is regulated through switch 506 in a non-shunting mode may now be the average current that is regulated through switch 508 in a shunting mode.

In embodiments, when H-bridge 520 operates in buck mode when the LEDs in string 516 are conducting, the average current through inductor 510 may, thus, be substantially the same as the average current through LED string 516. For example, the average current through inductor 510 may be substantially equal to the average current through LED string 516. Therefore, the average current in inductor 510 during shunting mode may also be substantially the same since H-bridge 520 is also operating in a buck configuration.

It is understood that the H-bridge buck-boost converter topology, including its control circuit illustrated in driver circuit 600, are not limited to the constructional detail shown there or described in the accompanying text. As those skilled in the art will appreciate, any suitable control circuit may be used to accomplish the objectives of the present disclosure. Similarly, those skilled in the art will recognize that a number of the elements described above may be physically and/or functionally separated into sub-modules or combined in various configurations.

It is further understood that, in a non-shunting mode, the H-bridge buck-boost converter may operate in buck mode, boost mode, and buck-boost mode, while achieving the objectives of the present disclosure.

Figure 7:
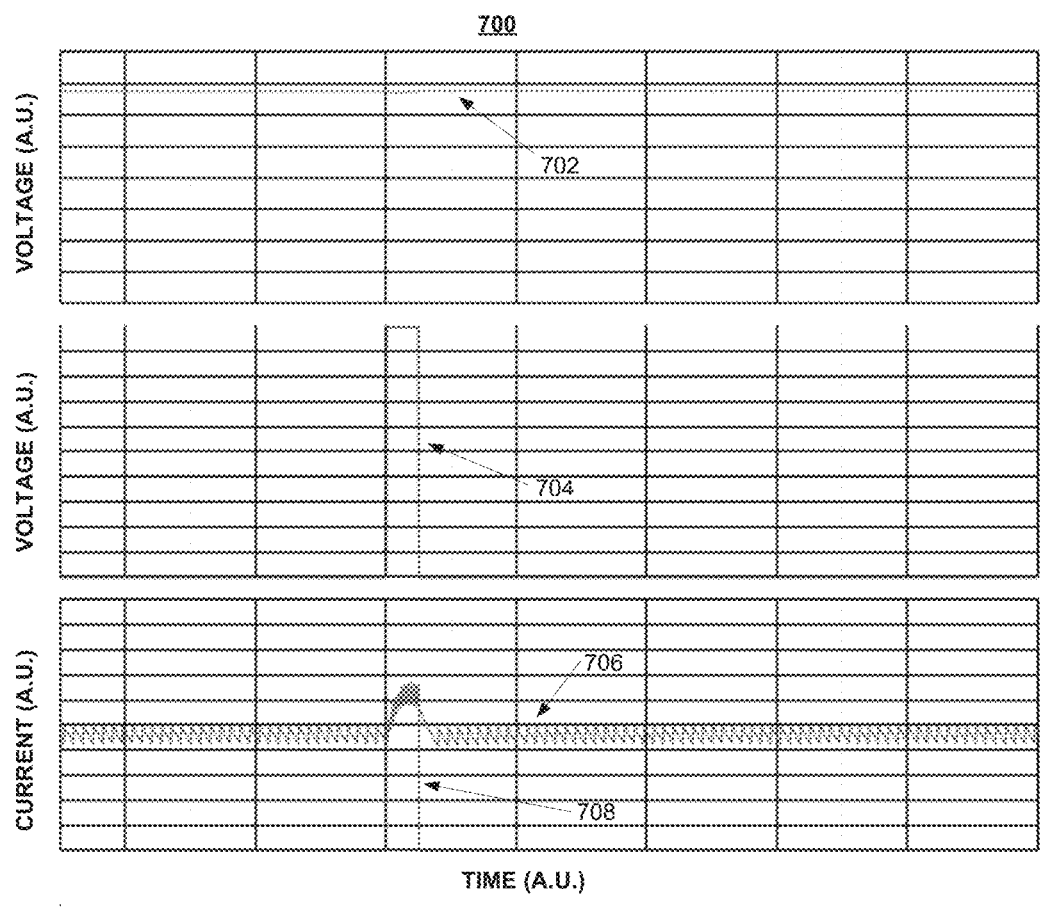
FIG. 7 shows exemplary simulation results illustrating the effect of average current mode control as applied to a switched-mode LED driver circuit, according to various embodiments of the present disclosure.

Experimental results demonstrate that such control schemes are expected to achieve LED current pulse widths in the order of less than a microsecond. FIG. 7 shows exemplary simulation results that illustrate the effect of average current mode control as applied to a switched-mode LED driver circuit, according to various embodiments of the present disclosure. It shall be noted that these experiments and results are provided by way of illustration and were performed under specific conditions using a specific embodiment or embodiments; accordingly, neither these experiments nor their results shall be used to limit the scope of the disclosure of the current patent document.

The results in FIG. 7 demonstrate that a very narrow PWM dimming pulse 704 and LED current 708 can be achieved using a topology similar to that shown in FIG. 6 to switch from the outer loop to the inner loop during a dimming phase. In various embodiments, this is accomplished without the need for an additional shunting FET or a grounding FET for the output capacitor. As shown in FIG. 7, a substantially continuous inductor current 706 of about 1 A and an output voltage 702 of about 7V can be maintained, free of unwanted drops and other perturbations that otherwise could negatively affect circuit performance, including ESR performance, and the like.

Figure 8:
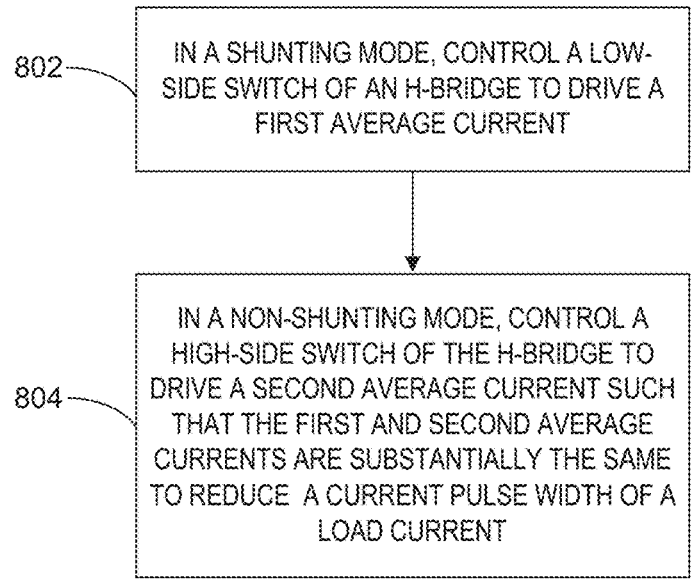
FIG. 8 is a flowchart of an illustrative process for generating short load current pulses using an H-bridge in accordance with various embodiments of the present disclosure.

FIG. 8 is a flowchart of an illustrative process for generating short load current pulses using an H-bridge in accordance with various embodiments of the present disclosure. In embodiments, process 800 for generating short load current pulses may begin at step 802 when, in a shunting mode, a low-side switch of an H-bridge is controlled to drive a first average current. At step 804, in a non-shunting mode, a high-side switch of the H-bridge may be controlled to drive a second average current. The first and second average switch currents are substantially the same, thereby, gaining the advantage of shunt dimming by maintaining the energy in the inductor without the disadvantage of discharging the output capacitor. In embodiments, in a buck mode, the current flowing through the inductor will be the same in both shunting mode and non-shunting mode, e.g., when LEDs that represent a load are conducting.

One skilled in the art shall recognize that: (1) certain steps may optionally be performed; (2) steps may not be limited to the specific order set forth herein; (3) certain steps may be performed in different orders; and (4) certain steps may be done concurrently.

Figure 9:
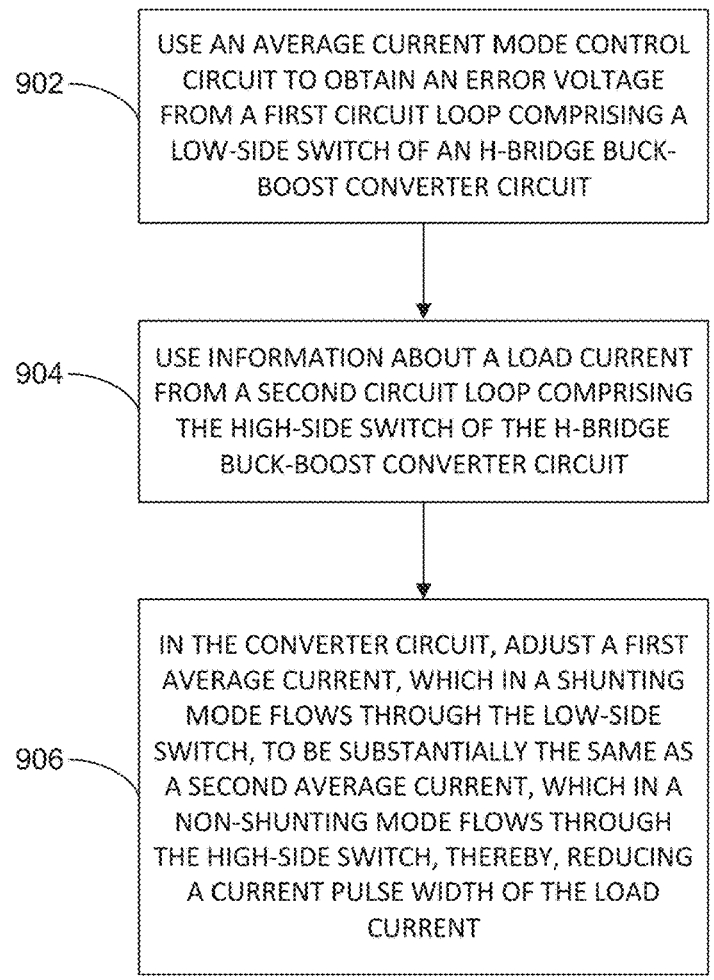
FIG. 9 is a flowchart of an alternative process for generating short load current pulses using an H-bridge in accordance with various embodiments of the present disclosure.

FIG. 9 is a flowchart of an alternative process for generating short load current pulses using an H-bridge in accordance with various embodiments of the present disclosure. In embodiments, process 900 may begin at step 902 when, an average current mode control circuit is used to obtain an error voltage from a first circuit loop that comprises a low-side switch, e.g., in an H-bridge buck-boost converter circuit.

At step 904, information about a load current may be used, e.g., from a second circuit loop comprising the high-side switch of the H-bridge buck-boost converter circuit.

Finally, at step 906, a first average current, which in a shunting mode flows through the low-side switch in the converter circuit, may be adjusted to be substantially the same as a second average current, which in a non-shunting mode flows through the high-side switch.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A buck-boost driver circuit comprising:
   an H-bridge comprising:
      a low-side switch that, in a shunting mode, carries a first average current;
      a high-side switch that, in a non-shunting mode, carries a second average current; and
      an average current mode control circuit that uses an error voltage from a first circuit loop that comprises the low-side switch and uses a load current from a second circuit loop that comprises the high-side switch to adjust the first and second average currents to be substantially the same to reduce a current pulse width of the load current.

2. The circuit of claim 1, wherein the average current mode control circuit uses the error voltage from the first circuit loop and the information about the load current from the second circuit loop to adjust the first and second average currents.

3. The circuit of claim 2, further comprising a set of comparators that uses the error voltage to determine a duty cycle of at least one or more switches of the H-bridge.

4. The circuit of claim 2, further comprising a reference voltage, the average current mode control circuit using the reference voltage to control the load current.

5. The circuit of claim 1, wherein the H-bridge comprises an inductor that, in a buck mode, carries a same average inductor current in both the shunting mode and the non-shunting mode.

6. The circuit of claim 1, wherein the low-side switch of the H-bridge allows an output capacitor of the buck-boost driver circuit to operate without a shunt switch.

7. The circuit of claim 6, wherein the output capacitor is coupled in a series connection with a load and with the high-side switch of the H-bridge that acts as an isolation switch, which allows the output capacitor to be directly connected to a ground potential.

8. The circuit of claim 7, wherein the load comprises a set of light-emitting diodes (LEDs).

9. The circuit of claim 1, wherein the low-side switch and the high-side switch are boost switches.

10. A method for generating short load current pulses using an H-bridge, the method comprising:
   in a shunting mode, controlling a low-side switch of an H-bridge to drive a first average current; and
   in a non-shunting mode, controlling a high-side switch of the H-bridge to drive a second average current, the first and second average currents being substantially the same to reduce a current pulse width of a load current.

11. The method of claim 10, further comprising an average current mode control circuit that uses an error voltage from a first circuit loop that comprises the low-side switch and uses information about the load current from a second circuit loop that comprises the high-side switch to adjust the first and second average currents to be substantially the same.

12. The method of claim 11, wherein the error voltage is coupled to a set of comparators that determines a duty cycle of one or more switches of the H-bridge.

13. The method of claim 11, wherein the average current mode control circuit uses a reference voltage to control the load current.

14. The method of claim 10, wherein the low-side switch of the H-bridge allows an output capacitor to operate without a shunt switch.

15. The method of claim 10, wherein the H-bridge comprises an inductor that, in a buck mode, carries a same average inductor current in both the shunting mode and the non-shunting mode.

16. The method of claim 14, wherein the high-side switch of the H-bridge is coupled in a series connection with the output capacitor and the load and acts as an isolation switch that allows the output capacitor to be directly connected to a ground potential.

17. The method of claim 16, wherein the load comprises a set of light-emitting diodes (LEDs).

18. The method of claim 17, wherein the set of LEDs comprises a plurality of LEDs that are coupled in a series configuration.

19. The method of claim 10, wherein the low-side switch and the high-side switch are boost switches.

20. A buck-boost driver circuit comprising:
an H-bridge comprising:
- a low-side switch that, in a shunting mode, carries a first average current;
- a high-side switch that, in a non-shunting mode, carries a second average current; and
- an average current mode control circuit that uses an error voltage from a first circuit loop that comprises the low-side switch and uses a load current from a second circuit loop that comprises the high-side switch to adjust the first and second average currents to be substantially the same to reduce a current pulse width of the load current, the low-side switch allowing an output capacitor of the buck-boost driver circuit to operate without a shunt switch; and
- a set of comparators that uses the error voltage to determine a duty cycle of at least one or more switches of the H-bridge.

* * * * *